US012597025B2

(12) United States Patent   (10) Patent No.: US 12,597,025 B2
Guo et al.   (45) Date of Patent: Apr. 7, 2026

(54) BLOCKCHAIN TRANSACTION EXECUTION METHOD AND APPARATUS, PROGRAM PRODUCT, DEVICE, AND MEDIUM

(71) Applicant: Tencent Technology (Shenzhen) Company Limited, Guangdong (CN)

(72) Inventors: Rui Guo, Shenzhen (CN); Zongyou Wang, Shenzhen (CN); Yifang Shi, Shenzhen (CN); Zhiyong Liao, Shenzhen (CN); Gengliang Zhu, Shenzhen (CN); Qucheng Liu, Shenzhen (CN); Hanqing Liu, Shenzhen (CN); Hu Lan, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 97 days.

(21) Appl. No.: 18/379,583

(22) Filed: Oct. 12, 2023

(65) Prior Publication Data

US 2024/0104558 A1 Mar. 28, 2024

Related U.S. Application Data

(63) Continuation of application No. PCT/CN2023/111719, filed on Aug. 8, 2023.

(30) Foreign Application Priority Data

Sep. 26, 2022 (CN) .......................... 202211174267.3

(51) Int. Cl.
*G06Q 20/38* (2012.01)
*G06Q 20/02* (2012.01)

(52) U.S. Cl.
CPC ......... *G06Q 20/3827* (2013.01); *G06Q 20/02* (2013.01); *G06Q 20/3825* (2013.01); *G06Q 20/389* (2013.01)

(58) Field of Classification Search
CPC .............. G06Q 20/3827; G06Q 20/02; G06Q 20/3825; G06Q 20/389; H04L 9/3247; H04L 9/50
See application file for complete search history.

(56) References Cited

U.S. PATENT DOCUMENTS 11,049,128 B1* 6/2021 Olson ................ G06Q 20/4014
2020/0175003 A1* 6/2020 Jiang ................... G06F 16/2379
(Continued)

FOREIGN PATENT DOCUMENTS

CN   114116134 A   3/2022
CN   114358936 A   4/2022

OTHER PUBLICATIONS

Wang et al., A Cross-chain solutions based on Proxy Network, 2021, IEEE, 2021 18th International Computer Conference on Wavelet Active Media Technology and Information Processing, pp. 89-93 (Year: 2021).*

(Continued)

*Primary Examiner* — Yingying Zhou
(74) *Attorney, Agent, or Firm* — ArentFox Schiff LLP

(57) ABSTRACT

In a blockchain transaction execution method, a first transaction of a first blockchain is received from a proxy program component. The first transaction is based on a second transaction of a second blockchain. A data structure of the first transaction is different from a data structure of the second transaction. The second transaction is extracted from the first transaction. A virtual machine is invoked to execute the second transaction of the second blockchain. An execution result of the second transaction is transmitted to the application via the proxy program component.

19 Claims, 8 Drawing Sheets

(56) References Cited

U.S. PATENT DOCUMENTS

| | | | | |
|---|---|---|---|---|
| 2020/0177572 A1* | 6/2020 | Qui | .................... | G06F 16/2379 |
| 2020/0364703 A1* | 11/2020 | Joveski | .................... | H04L 9/50 |
| 2021/0036857 A1* | 2/2021 | Qiu | .................... | H04L 9/3247 |
| 2021/0258143 A1* | 8/2021 | Xie | .................... | G06F 9/455 |
| 2021/0326876 A1* | 10/2021 | Wei | .................... | H04L 9/3239 |
| 2021/0350019 A1* | 11/2021 | Zhang | .................... | G06F 16/252 |
| 2022/0129884 A1* | 4/2022 | Agrawal | .................... | H04L 9/3218 |
| 2022/0173893 A1* | 6/2022 | Basu | .................... | H04L 9/3247 |
| 2024/0289793 A1* | 8/2024 | Jentzsch | .................... | G06Q 20/02 |
| 2025/0038993 A1* | 1/2025 | Li | .................... | H04L 9/3239 |

OTHER PUBLICATIONS

Ou et al., An Overview on Cross-chain: Mechanism, platforms, challenges and advances, May 4, 2022, Elsevier B. V.; pp. 1-21 (Year: 2022).*

Wang et al., Dynamic Adaptive Cross-Chain Trading Mode for Multi-microgrid Joint Operation, Oct. 2020, MDPI, pp. 1-20 (Year: 2020).*

Li et al., A cross-chain technology based on a licensed public chain, Feb. 25-27, 2022, IEEE, 2022 IEEE International Conference on Electrical Engineering, Big Data and Algorithms (EEBDA), pp. 1168-1173 (Year: 2022).*

International Search Report issued in International Application No. PCT/CN2023/111719, mailed Oct. 31, 2023, with English Translation, 13 pages.

Ethereum JSON-RPC Specification, https://ethereum.github.io/execution-apis/api-documentation/, pp. 1-3.

MetaMask, https://chromewebstore.google.com/detail/metamask/nkbihfbeogaeaoehlefnkodbefgpgknn, pp. 1-3.

* cited by examiner

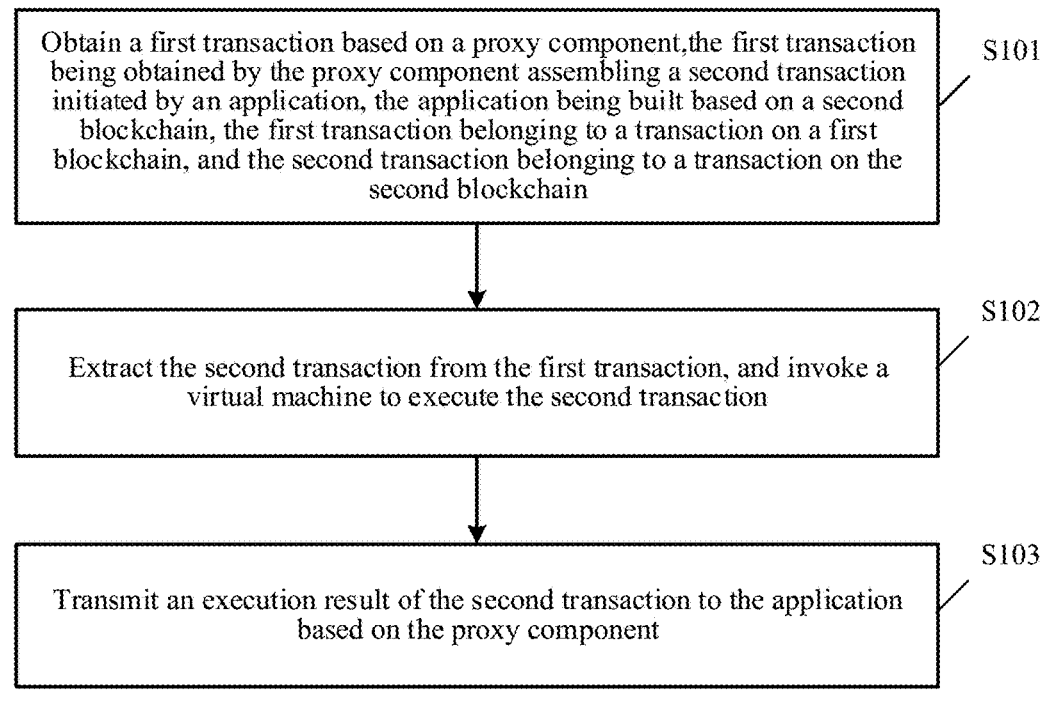

Obtain a first transaction based on a proxy component,the first transaction being obtained by the proxy component assembling a second transaction initiated by an application, the application being built based on a second blockchain, the first transaction belonging to a transaction on a first blockchain, and the second transaction belonging to a transaction on the second blockchain — S101

Extract the second transaction from the first transaction, and invoke a virtual machine to execute the second transaction — S102

Transmit an execution result of the second transaction to the application based on the proxy component — S103

FIG. 3

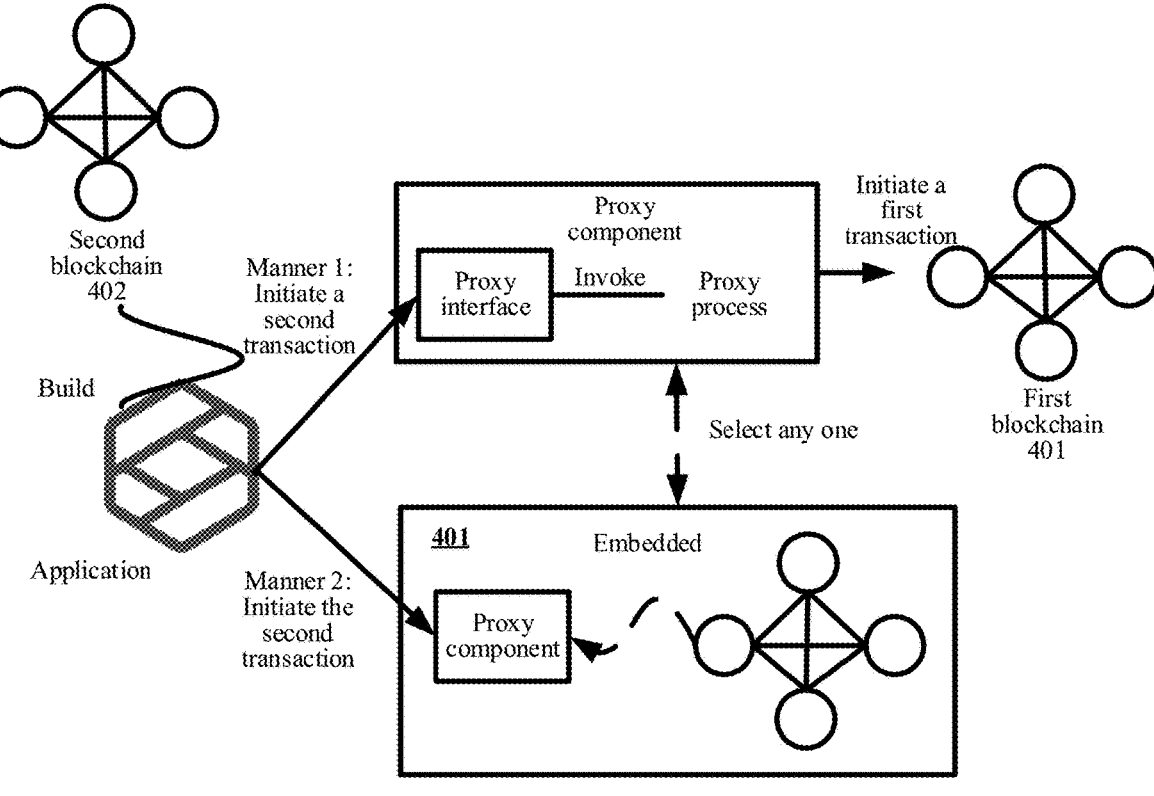

BLOCKCHAIN TRANSACTION EXECUTION METHOD AND APPARATUS, PROGRAM PRODUCT, DEVICE, AND MEDIUM

RELATED APPLICATIONS

This application is a continuation of International Application No. PCT/CN2023/111719, filed on Aug. 8, 2023, which claims priority to Chinese Patent Application No. 202211174267.3, entitled "BLOCKCHAIN TRANSACTION EXECUTION METHOD AND APPARATUS, PROGRAM PRODUCT, DEVICE, AND MEDIUM" and filed on Sep. 26, 2022. The entire disclosures of the prior applications are hereby incorporated by reference.

FIELD OF THE TECHNOLOGY

This disclosure relates to the field of blockchain technologies, including to a blockchain transaction execution method and apparatus, a program product, a device, and a medium.

BACKGROUND OF THE DISCLOSURE

In an application field of a blockchain, structures of transactions on different blockchains may be different. If an application is built based on a blockchain a, a transaction initiated by the application belongs to a transaction on the blockchain a.

When the transaction initiated by the application is expected to be executed on a blockchain b, the application may need to be modified, so that a transaction initiated by the modified application can meet a structure of a transaction on the blockchain b. However, a plurality of technical points are involved in reconstructing the application, which makes it more difficult to execute the transaction on the blockchain a on the blockchain b.

SUMMARY

This disclosure provides a blockchain transaction execution method and apparatus, a program product, a device, and a non-transitory computer-readable storage medium, so that in a case that a structure of a transaction on a first blockchain is different from a structure of a transaction on a second blockchain, flexibility of transaction execution can be improved, and difficulty of executing the transaction on the second blockchain on the first blockchain can be reduced.

An aspect of this disclosure provides a blockchain transaction execution method. In an example, the method is performed by a blockchain node on a first blockchain, and a virtual machine configured to execute a transaction on a second blockchain being configured on the first blockchain; a structure of a transaction on the first blockchain being different from a structure of the transaction on the second blockchain. In the method, a first transaction of a first blockchain is received from a proxy program component. The first transaction is based on a second transaction of a second blockchain. A data structure of the first transaction is different from a data structure of the second transaction. The second transaction is extracted from the first transaction. A virtual machine is invoked to execute the second transaction of the second blockchain. An execution result of the second transaction is transmitted to the application via the proxy program component.

An aspect of this disclosure provides a blockchain transaction execution apparatus. In an example, the apparatus is disposed on a blockchain node on a first blockchain, and a virtual machine configured to execute a transaction on a second blockchain being configured on the first blockchain; a structure of a transaction on the first blockchain being different from a structure of the transaction on the second blockchain. The apparatus includes processing circuitry that is configured to receive a first transaction of a first blockchain from a proxy program component. The first transaction is based on a second transaction of a second blockchain. A data structure of the first transaction is different from a data structure of the second transaction. The processing circuitry is configured to extract the second transaction from the first transaction. The processing circuitry is configured to invoke a virtual machine to execute the second transaction of the second blockchain. The processing circuitry is configured to transmit an execution result of the second transaction to the application via the proxy program component.

An aspect of this disclosure provides a computer device, including a memory and a processor, the memory storing a computer program, the computer program being loaded and executed by the processor to implement the blockchain transaction execution method.

An aspect of this disclosure provides a non-transitory computer-readable storage medium, storing instructions which when executed by a processor cause the processor to implement the blockchain transaction execution method.

An aspect of this disclosure provides a computer program product or a computer program, the computer program product or the computer program including a computer program, the computer program being stored in a computer-readable storage medium. A processor of a computer device reads the computer program from the computer-readable storage medium, and executes the computer program, to cause the computer device to perform the blockchain transaction execution method.

In this disclosure, a virtual machine configured to execute a transaction on a second blockchain may be configured on a first blockchain. A structure of a transaction on the first blockchain being different from a structure of the transaction on the second blockchain. A blockchain node on the first blockchain may obtain a first transaction based on a proxy component. The first transaction is obtained by the proxy component assembling a second transaction initiated by an application, the application is built based on the second blockchain, the first transaction belongs to the transaction on the first blockchain, and the second transaction belongs to the transaction on the second blockchain. The blockchain node on the first blockchain may further extract the second transaction from the first transaction, invoke the virtual machine to execute the second transaction, and transmit an execution result of the second transaction to the application based on the proxy component. It can be understood that according to the method provided in this disclosure, related transaction conversion and data exchange between the application under the second blockchain and the first blockchain may be implemented through the proxy component, and the virtual machine configured to execute the transaction on the second blockchain may be further configured on the first blockchain. Therefore, even if the structure of the transaction on the first blockchain is different from the structure of the transaction on the second blockchain, the transaction on the second blockchain can also be implemented on the first blockchain without being limited to execution by a blockchain node on the second blockchain, thereby improving flexibility of transaction execution. In addition, without modifying the disclosure under the second blockchain, the first blockchain can execute the transaction on the second blockchain, to reduce difficulty for a blockchain to execute a transaction that does not belong to the blockchain, thereby improving convenience and efficiency of cross-blockchain transaction execution.

BRIEF DESCRIPTION OF THE DRAWINGS

FIG. 3 is a schematic flowchart of a blockchain transaction execution method according to an embodiment of this disclosure.

FIG. 4 is a schematic diagram of a scenario of initiating a transaction according to an embodiment of this disclosure.

DESCRIPTION OF EMBODIMENTS

Figure 1:
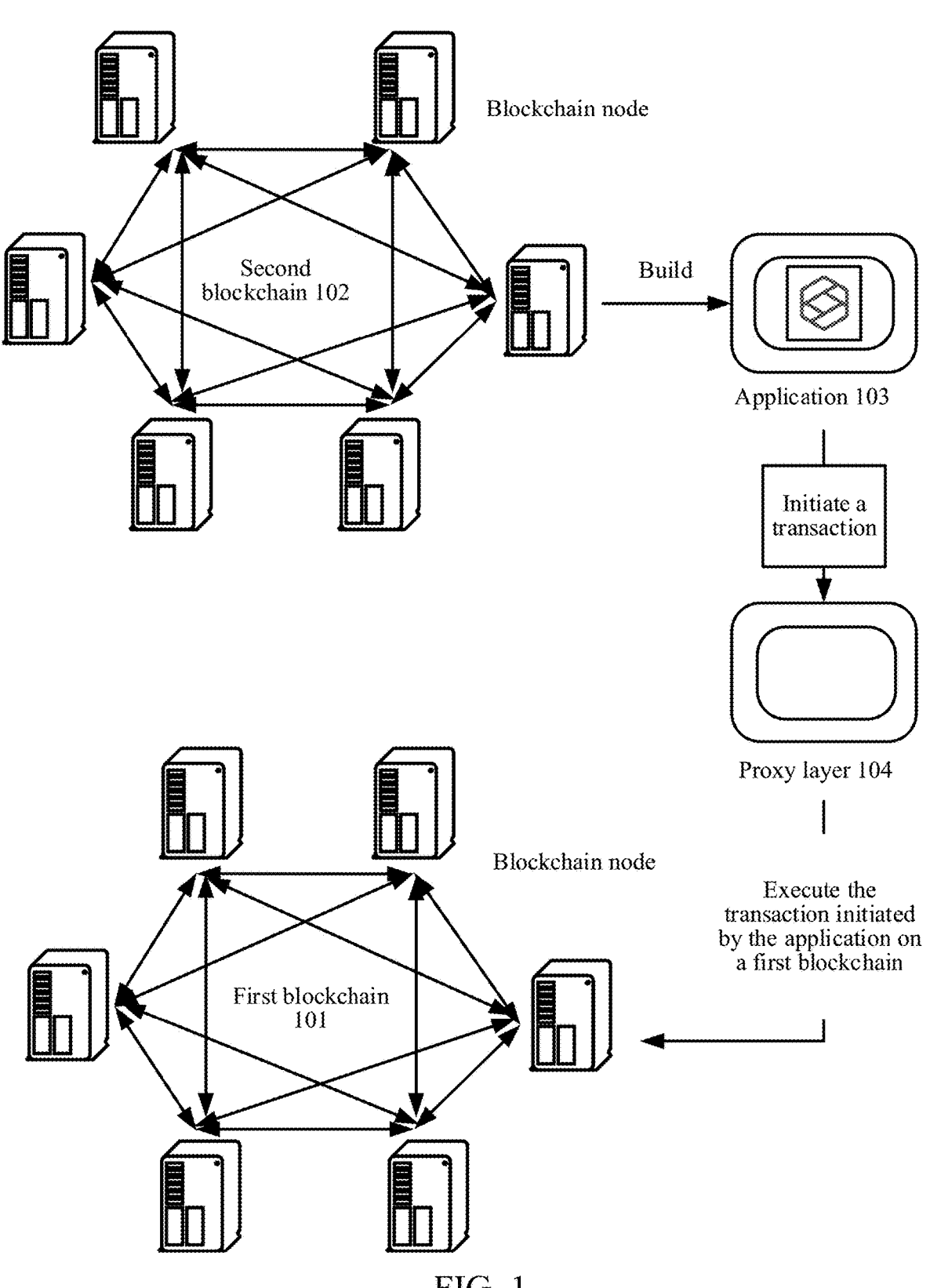
FIG. 1 is a schematic structural diagram of a network architecture according to an embodiment of this disclosure.

Technical solutions of this disclosure are described below with reference to the accompanying drawings of this disclosure. The described embodiments are merely some rather than all embodiments of this disclosure. Other embodiments shall fall within the scope of this disclosure.

This disclosure relates to a blockchain technology. A blockchain includes computer technologies such as distributed data storage, point-to-point transmission, a consensus mechanism, and an encryption algorithm. The blockchain includes, for example, a decentralized database and a series of associated data blocks (that is, blocks) generated in a cryptographic manner. Each data block includes information about a batch of network transactions for verifying the validity of the information (for anti-counterfeiting) and generating a next block. The blockchain may include an underlying blockchain platform, a platform product service layer, and an application service layer. The blockchain includes a series of blocks that are consecutive in a chronological order of generation. Once a new block is added to the blockchain, the new block is no longer removed. The block records recorded data committed by a blockchain node in a blockchain system.

In this disclosure, without modifying an application of a blockchain, a transaction initiated by the application can be executed by using another blockchain, to reduce modification costs of the application in an application migration process and reduce difficulty for a blockchain to execute a transaction that does not belong to the blockchain, thereby improving convenience and efficiency of cross-blockchain transaction execution.

This disclosure may further relate to cloud technology. The cloud technology (Cloud Technology) is, for example, a hosting technology that unifies a series of resources such as hardware, software, and networks in a wide area network or a local area network to implement computing, storage, processing, and sharing of data.

The cloud technology may be a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, image websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

In this disclosure, an application under a second blockchain, a proxy component, or a blockchain node on a first blockchain may exchange data through "cloud".

FIG. 1 is a schematic structural diagram of a network architecture according to an embodiment of this disclosure. The network architecture may be implemented as a cross-blockchain transaction execution system. The network architecture may include two blockchains (for example, a first blockchain 101 and a second blockchain 102), an application 103, and a proxy layer 104 (which may be a proxy component).

The first blockchain 101 and the second blockchain 102 may be blockchains of any type. The first blockchain 101 and the second blockchain 102 may be two different blockchains, and a structure of a transaction on the first blockchain 101 is different from a structure of a transaction on the second blockchain 102.

There may be a plurality of blockchain nodes on the first blockchain 101, and there may also be a plurality of blockchain nodes on the second blockchain 102. One blockchain node may be formed through one or more computer devices, and the computer device may be a server or a terminal device.

The application 103 may be built based on the second blockchain 102, and a transaction initiated through the application 103 also belongs to the transaction on the second blockchain 102. The application 103 may be run on the terminal device. The terminal device may include at least one of the following: a smart terminal such as a smartphone, a tablet computer, a notebook computer, a desktop computer, a smart television, an in-vehicle terminal, a smart robot, or a medical device.

In an example, the transaction initiated by the application 103 may be executed on the first blockchain through the proxy layer 104. For details, reference is made to descriptions of the following content.

Figure 2:
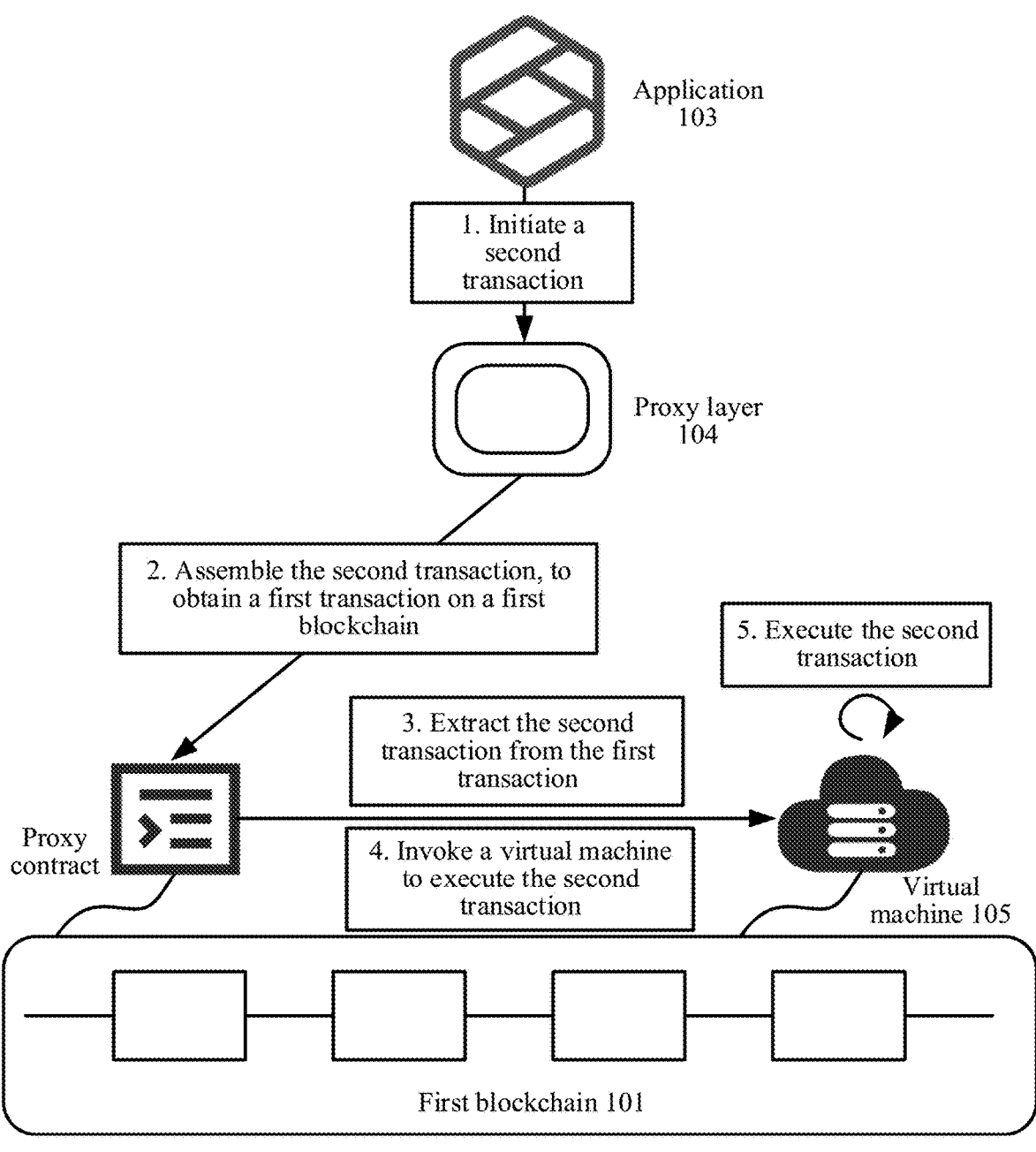
FIG. 2 is a schematic diagram of a scenario of executing a transaction according to an embodiment of this disclosure.

FIG. 2 is a schematic diagram of a scenario of executing a transaction according to an embodiment of this disclosure. As shown in FIG. 2, the application 103 may initiate a transaction (for example, a second transaction) to the proxy layer 104, where the second transaction may be any transaction that is initiated by the application 103 and that belongs to the second blockchain 102, and the application 103 may send the second transaction to the proxy layer 104.

The proxy layer 104 may be a preconfigured layer that can be docked with a standard interface (for example, a transaction interface) of the second blockchain, that is, the proxy layer 104 may be compatible with the standard interface of the second blockchain 102, for example, an interface that is compatible with the standard interface of the second blockchain 102 is deployed on the proxy layer 104. The application 103 may directly invoke the standard interface of the second blockchain 102 to initiate the second transaction to the proxy layer 104. In this way, a basis is provided for cross-blockchain transaction execution. Only the proxy layer that can correspond to the standard interface of the second blockchain needs to be constructed without modifying the application. Therefore, convenience of executing the transaction on the second blockchain on the first blockchain is improved.

The proxy layer 104 may reassemble the second transaction, to obtain a first transaction on the first blockchain 101. The second transaction may be assembled in the first transaction. A service logic in which the proxy layer 104 assembles the second transaction to obtain the first transaction may be preconfigured. For example, assembly is performed according to the structure of the transaction on the first blockchain 101 by using the second transaction as a parameter, to obtain the first transaction, and a structure of the first transaction meets the structure of the transaction on the first blockchain 101.

The proxy layer 104 may send the first transaction obtained through assembling to any blockchain node on the first blockchain 101 (that is, any blockchain node on the first blockchain 101 may execute a subsequent operation, to execute the second transaction). A proxy contract (which is a smart contract and may be used for implementing related service processing on the second transaction) may be configured in the blockchain node. Therefore, after obtaining the first transaction, the blockchain node may invoke the proxy contract to extract the second transaction from the first transaction and execute the second transaction according to the proxy contract.

In some example, if the proxy layer 104 does not belong to the first blockchain 101, the proxy layer 104 may alternatively be configured as a layer that can be compatible with a standard interface of the first blockchain 101, and the proxy layer 104 may send the first transaction to the blockchain node on the first blockchain 101 through the standard interface (for example, a transaction interface) of the first blockchain 101.

In some examples, a virtual machine 105 configured to execute the transaction on the second blockchain 102 may be further configured in the blockchain node (a blockchain node mentioned subsequently may be the blockchain node on the first blockchain 101). Therefore, the blockchain node may further invoke the virtual machine 105 through the proxy contract to execute the extracted second transaction. After completing the execution of the second transaction through the virtual machine 105, the blockchain node may store service data (for example, a transaction receipt) related to the execution of the second transaction in the proxy contract.

In an example, the blockchain node may alternatively send an execution result of the second transaction (for example, a transaction receipt for the second transaction) to the application 103 through the proxy layer 104. For a specific process, reference may be made to related content in an embodiment corresponding to FIG. 3, and details are not described herein again.

Based on the foregoing, according to the method provided in this embodiment of this disclosure, without modifying the application built based on the second blockchain, the application may initiate a transaction (for example, the second transaction) to the proxy layer according to an original service logic through the standard interface of the second blockchain. Further, the proxy layer may assemble the transaction into a transaction that meets the structure of the transaction on the first blockchain, and send the transaction (for example, the first transaction) obtained through assembling to the blockchain node on the first blockchain. The blockchain node executes the second transaction according to the proxy contract and a corresponding service logic (for example, a related service logic in which the second transaction is extracted from the first transaction, and then the virtual machine is invoked to execute the second transaction), to reduce difficulty of executing the transaction on the second blockchain on the first blockchain, thereby improving convenience and efficiency of executing the transaction on the second blockchain on the first blockchain, implementing a case that the transaction on the second blockchain is not limited to execution by a blockchain node on the second blockchain, and improving flexibility of transaction execution.

FIG. 3 is a schematic flowchart of a blockchain transaction execution method according to an embodiment of this disclosure. In this embodiment of this disclosure, an execution body may be any blockchain node on a first blockchain (for example, each blockchain node on the first blockchain may execute the following process). One blockchain node may be formed by one computer device or may be a computer device cluster formed by a plurality of computer devices. The computer device may be a server, a terminal device, another device, or the like. This is not limited in this disclosure. In this embodiment of this disclosure, the following execution body may be collectively referred to as a blockchain node (that is, the blockchain node on the first blockchain) for description. As shown in FIG. 3, the method may include the following steps.

Step S101. Obtain a first transaction based on a proxy component. The first transaction is obtained by the proxy component assembling a second transaction initiated by an application, the application is built based on a second blockchain, the first transaction belongs to a transaction on the first blockchain, and the second transaction belongs to a transaction on the second blockchain.

In this disclosure, the application may be an application deployed on a decentralized blockchain, and the application may also be referred to as a decentralized application (Dapp). The application may be built based on the second blockchain. The second blockchain may be a blockchain of any type. A transaction initiated by the application belongs to the transaction on the second blockchain, and a format of the transaction initiated by the application is a format of the transaction on the second blockchain. The application is not limited in this disclosure and is, for example, a payment application, a shopping application, or any application that has a transaction initiation function. The application may be an application in any form, for example, an application in a form of a webpage, an application in a form of software, or an application in a form of an applet. This is not limited in this disclosure.

The application may invoke a related interface of the second blockchain. Therefore, the application may initiate the second transaction to the proxy component by invoking a transaction interface of the second blockchain, where the second transaction may be any transaction on the second blockchain initiated by the application, for example, the second transaction may be a transaction in which resource transfer is performed.

The proxy component may be a preconfigured component that may be docked with, compatible with, and adapted to the related interface (for example, the transaction interface, where the transaction interface may be configured to initiate a related transaction on the second blockchain) of the second blockchain.

The proxy component may be formed by an independent process (which may be referred to as a target process) (that is, a function of the proxy component is implemented by the independent process), and the proxy component may further include a configured interface (which may be referred to as a proxy interface) configured to invoke the target process, that is, the proxy component may be formed by the proxy interface and the target process. In this case, the proxy component belongs to neither the first blockchain nor the second blockchain. The proxy component is independently disposed outside the first blockchain and the second blockchain, to avoid modifying the first blockchain and the second blockchain, thereby further reducing difficulty for a blockchain to execute a transaction that does not belong to the blockchain.

Alternatively, the proxy component may be a component embedded into the first blockchain (or may be included in a related interface configured on the first blockchain and a related process that can be invoked by the interface). In this case, the proxy component belongs to the first blockchain. The proxy component may be embedded into the first blockchain, to avoid transmission resource occupation caused by transmission of the first transaction.

For example, FIG. 4 is a schematic diagram of a scenario of initiating a transaction according to an embodiment of this disclosure. As shown in FIG. 4, for a manner 1, a proxy component may include a proxy interface and a proxy process (that is, the target process), and the proxy process may be invoked through the proxy interface. In this case, the proxy component is a component that does not belong to a first blockchain 401.

In this case, an application built based on a second blockchain 402 may invoke the proxy process through the proxy interface to initiate a second transaction to the proxy process. Further, the proxy process may reassemble the second transaction, to obtain a first transaction, and the proxy process may send the first transaction obtained through assembling to the first blockchain 401 (for example, send the first transaction to any blockchain node on the first blockchain 401), to complete a process of initiating the first transaction to the first blockchain 401.

For a manner 2, the proxy component is a component embedded into the first blockchain 401. Therefore, after the application initiates the second transaction to the proxy component, the blockchain node on the first blockchain 401 directly assembles the second transaction based on the proxy component, to obtain the initiated first transaction.

In this disclosure, the second transaction needs to be executed on the first blockchain, and the first blockchain may be any blockchain different from the second blockchain. For example, the first blockchain is a common blockchain, and the second blockchain is an Ethereum. Because the first blockchain and the second blockchain are different blockchains, a structure of a transaction on the first blockchain is also different from a structure of a transaction on the second blockchain, that is, the second transaction cannot be directly executed on the first blockchain. Therefore, when receiving the second transaction initiated by the application, the proxy component may reassemble the second transaction, to obtain a transaction (which may be referred to as the first transaction) on the first blockchain, where a structure of the first transaction belongs to the structure of the transaction on the first blockchain.

The structure of the first transaction may be shown in the following Table 1.

TABLE 1

| Field | Description |
| --- | --- |
| version | Transaction version |
| timestamp | Timestamp |
| from | Sender address |
| contractID | Invoked contract identity document (ID) |
| method | Invoked contract method |
| params | Parameter inputted when invoking a contract, where there may be a plurality of parameters (the second transaction may be used as a parameter) |
| gasPrice | Price that a user is willing to pay for each gas |
| gas | Allowed gas limit (gas amount) |
| hash | Transaction hash |
| signature | Signature value (that is, a transaction signature) |

In this disclosure, the second transaction may be executed through a proxy contract (which is a smart contract preconfigured on the first blockchain and is used for executing a transaction that does not belong to the blockchain) on the first blockchain. Therefore, the first transaction may be a transaction for invoking the proxy contract, and identification information of the proxy contract corresponding to the first blockchain may be assembled in the first transaction. Because the proxy contract may include a plurality of proxy methods (different proxy methods may correspond to different service processing logics of the proxy contract), the identification information may include an identifier (ID) of the proxy contract and a proxy method specified in the proxy contract.

In an example, the second transaction may be assembled in the first transaction as an input parameter for invoking the proxy contract, that is, a complete second transaction may be assembled in the first transaction. The blockchain node may obtain the first transaction based on the proxy component. If the proxy component is independently formed by the target process and the proxy interface, the first transaction may be sent to the blockchain node after the proxy component reassembles the received second transaction. If the proxy component is a component embedded into the first blockchain, the first transaction may be obtained by the blockchain node reassembling the received second transaction based on the proxy component.

After receiving the second transaction initiated by the application, the proxy component assembles the related identification information of the proxy contract and the second transaction into a related service logic of the first transaction. The proxy component may be preconfigured.

The proxy contract is configured on the first blockchain, and the proxy contract may be configured in each blockchain node on the first blockchain. The method for executing a transaction that does not belong to the present blockchain (for example, the first blockchain) through the proxy contract is an exemplary method. Through the proxy contract, related service logics for executing one or even more transactions on another blockchain on the present blockchain can be elegantly and flexibly adapted, and only the proxy contract needs to be correspondingly configured.

The transaction that does not belong to the present blockchain may alternatively be executed through a related transaction execution interface configured on the first blockchain rather than the proxy contract. When the transaction that does not belong to the present blockchain is executed through the transaction execution interface, the first transaction may be a transaction used for invoking the transaction execution interface, and the second transaction may also be assembled in the first transaction.

The second transaction may be a transfer transaction. A structure (or a format) of the second transaction may be shown in the following Table 2.

TABLE 2

| Field | Description |
| --- | --- |
| type | Transaction type |
| nonce | Quantity of transactions that have been sent by a sender |
| to | Receiver address, which may be an external account address or a contract address; and if the to field is null, it indicates that the present transaction is used for creating a contract. In this case, the following data field is an input (for example, a contract code) for creating the contract |
| gas | Allowed gas limit (gas amount) |
| value | Quantity of transferred resources |
| data | Parameter inputted when invoking a contract; and if the to field is null, the parameter is the input for creating the contract |
| gasPrice | Price that a user is willing to pay for each gas |
| signature | Signature value (that is, a transaction signature) |

The quantity of transactions that have been sent by the sender is a quantity of transactions that have been sent by an object to which the application belongs.

Step S102. Extract the second transaction from the first transaction, and invoke a virtual machine to execute the second transaction.

If the second transaction is executed through the proxy contract, the blockchain node may extract, from the first transaction, identification information of the proxy contract that needs to be invoked, identify and invoke the corresponding proxy contract by using the identification information, and extract the second transaction from the first transaction (the second transaction may be represented as binary data).

A virtual machine configured to execute the transaction on the second blockchain may be configured on the first blockchain. The virtual machine may be understood as a computer system with a hardware system function that is simulated through software and that runs in an isolated environment and may execute the transaction on the second blockchain, and the virtual machine may identify and execute a related code language of the second blockchain.

After invoking the proxy contract and extracting the second transaction from the first transaction, the blockchain node may invoke the virtual machine through the proxy contract to execute the second transaction.

Alternatively, if the second transaction is executed through the configured transaction execution interface, the blockchain node may invoke the transaction execution interface by using the first transaction, may extract the second transaction from the first transaction by invoking the transaction execution interface, and may further invoke the virtual machine through the transaction execution interface to parse and execute the second transaction.

In some examples, before invoking the virtual machine to execute the second transaction, the blockchain node needs to verify the second transaction. If the verification succeeds (that is, the verification succeeds), the virtual machine may be invoked to execute the extracted second transaction. The verification may include at least one of the following.

A first verification process may include, in a case that the execution of the second transaction is completed, a transaction hash of the second transaction (that is, a hash value of the second transaction) may be stored in the proxy contract, where the transaction hash of the second transaction may be used for identifying the second transaction. Therefore, the proxy contract may be used for performing repetition determining on a transaction (that is, whether transaction has been executed). For example, before the virtual machine is invoked by using the proxy contract to execute the second transaction, it may be detected (queried) whether the transaction hash of the second transaction is stored in the proxy contract. If it is detected that the transaction hash of the second transaction is not stored in the proxy contract, it indicates that the second transaction has not been executed, and the virtual machine may be invoked based on the proxy contract to execute the second transaction. In this way, repeated execution of the transaction can be avoided, and running pressure of the blockchain node can be reduced.

In a second verification process, the second transaction may have a transaction signature of the application, the transaction signature may be sent to the proxy component together with the second transaction, and then the proxy component sends the transaction signature and the second transaction to the blockchain node. Before invoking the virtual machine (for example, invoking the virtual machine through the proxy contract) to execute the second transaction, the blockchain node may invoke the virtual machine (for example, invoking the virtual machine through the proxy contract) to verify the second transaction based on the transaction signature (that is, signature verification), and then may invoke the virtual machine to execute the second transaction if the verification on the second transaction (that is, the transaction signature of the second transaction) succeeds. In this way, after the signature verification on the second transaction succeeds, the second transaction is executed, so that execution security of the second transaction can be improved.

In a process of verifying the second transaction based on the transaction signature, the transaction signature may be obtained by encrypting the transaction hash of the second transaction by the application by using a private key. The private key may be a private key of an object to which the application belongs on the second blockchain. The second transaction may carry a public key of the object, and the object may be any user, institution, enterprise, or the like that has an object account on the second blockchain.

The virtual machine may perform hash calculation on the extracted second transaction, to obtain a calculated hash value. The virtual machine may further decrypt the transaction signature of the second transaction by using a public key (which may be the public key of the object to which the application belongs on the second blockchain, and the public key and the private key of the object are a pair of keys) of the application in the second transaction, to obtain a decrypted hash value. The virtual machine may compare the calculated hash value with the decrypted hash value. If the calculated hash value is the same as the decrypted hash value, the virtual machine may determine that the verification on the second transaction succeeds, and if the calculated hash value is different from the decrypted hash value, the virtual machine may determine that the verification on the second transaction fails.

A third verification process may include, when generating the second transaction, the application may encapsulate a total quantity (that is, the quantity nonce of transactions) of transactions historically initiated by the application in the second transaction, that is, the quantity of transactions historically initiated by the application is assembled in the second transaction. The total quantity of transactions historically initiated by the application may be a total quantity of transactions historically initiated by the object to which the application belongs in the application, that is, a total quantity of transactions initiated before the second transaction is initiated.

Before invoking the virtual machine to execute the second transaction, the blockchain node may invoke the virtual machine (for example, invoking the virtual machine through the proxy contract, if there is the proxy contract, an operation executed by the virtual machine may be invoked and executed by the proxy contract) to obtain account information (which may be account information of an object account of the object to which the application belongs) of the application, where the account information may include a quantity of transactions historically initiated by the application. Therefore, the virtual machine may determine, by using the account information, the quantity of transactions historically initiated by the application.

The virtual machine may verify whether the quantity of transactions historically initiated by the application that is assembled in the second transaction is the same as the quantity of transaction historically initiated by the application that is determined according to the account information. If the quantity of transactions assembled in the second transaction is the same as the quantity of transactions determined according to the account information, the blockchain node may invoke the virtual machine to execute the second transaction. If the quantity of transactions assembled in the second transaction is different from the quantity of transactions determined according to the account information, it indicates that the second transaction is untrusted, and the blockchain node does not invoke the virtual machine to execute the second transaction. In this way, in a case that the verification on the quantity of transactions historically initiated by the application succeeds, the second transaction is executed. Therefore, the execution security of the transaction can be further improved.

The second blockchain may send the account information related to the object account of the object to the first blockchain, that is, transfer the related account information of the object on the second blockchain to the first blockchain, so that the object to which the application belongs can be more conveniently and quickly migrated from the second blockchain to the first blockchain with reference to the method in this disclosure.

In a fourth verification process, the second transaction may be a transaction in which the object (which may be referred to as a first object) to which the application belongs transfers a target resource (a specific resource type or a quantity of resources may be determined according to an actual application scenario) to a second object (which is another object that has an object account on the second blockchain and that is different from the first object). Therefore, the virtual machine may obtain an incentive resource (gas) required to execute the second transaction, that is, an incentive resource required by the blockchain node to invoke the virtual machine to execute the second transaction (for example, an incentive resource required to invoke a related transaction contract in the virtual machine to execute the second transaction).

The virtual machine may further obtain account information of the first object and may determine a remaining resource (which may be referred to as an account remaining resource) of the first object on the first blockchain according to the account information. It may be understood that an original resource of the first object may be on the second blockchain, but the second blockchain may transfer the resource of the first object to the first blockchain in a cross-chain manner.

During execution of the second transaction, it needs to be ensured that a sum of the incentive resource (which includes the incentive resource required to invoke the virtual machine to execute the second transaction) required to execute the second transaction and the target resource is less than or equal to the account remaining resource of the first object. Therefore, when determining that the sum of the incentive resource required to execute the second transaction and the target resource is less than or equal to the account remaining resource, it indicates that the verification on the account remaining resource of the first object succeeds, and the virtual machine may execute the second transaction. In this way, in a case that the verification on the account remaining resource succeeds, the second transaction is executed, so that a success rate of transaction execution can be further improved.

After all or some of the four verification processes meet a condition and the verification succeeds, the blockchain node may invoke the virtual machine to execute the second transaction.

In an example, a smart contract (which may be referred to as a transaction contract) used for executing the transaction on the second blockchain may be created in the virtual machine. Therefore, when invoking the virtual machine to execute the second transaction, the blockchain node may invoke the transaction contract through the virtual machine to execute the second transaction. The smart contract is, for example, a program or transaction protocol that is run when predetermined conditions are met.

Figure 5:
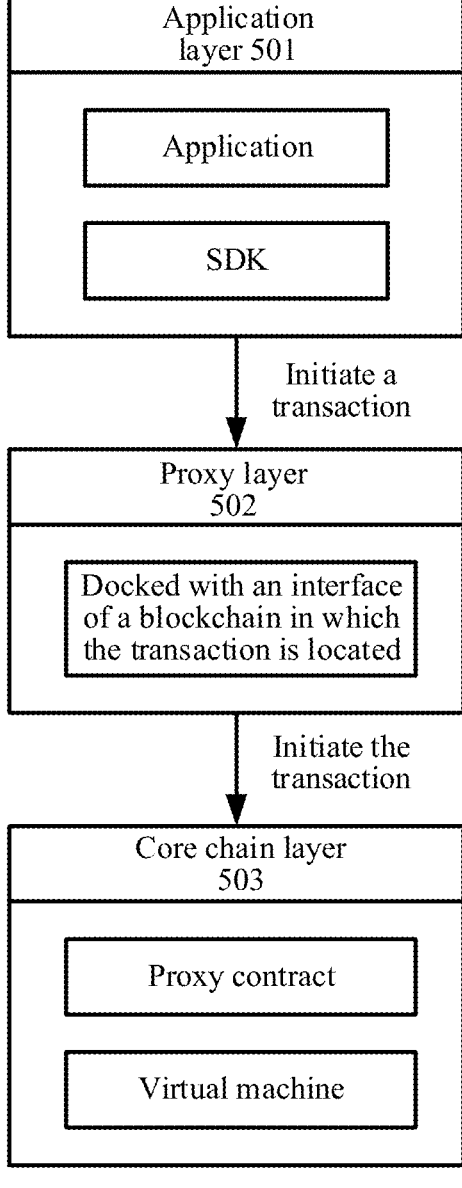
FIG. 5 is a schematic structural diagram of another network architecture according to an embodiment of this disclosure.

FIG. 5 is a schematic structural diagram of another network architecture according to an embodiment of this disclosure. As shown in FIG. 5, in this disclosure, the network architecture may include an application layer 501 (for example, an application built based on a second blockchain, and the application may be built by using a software development kit (SDK) of the second blockchain), a proxy layer 502 (for example, a proxy component, which may be docked with an interface of the second blockchain), and a core chain layer 503 (for example, a first blockchain, which may be configured with a proxy contract and a virtual machine).

The application layer 501 may initiate a transaction (for example, a second transaction) to the proxy layer 502, then the proxy layer 502 may reassemble the transaction initiated by the application layer 501, and send a reassembled transaction (for example, a first transaction) to the core chain layer 503, and then the core chain layer 503 may implement, by using the configured proxy contract and virtual machine, a process of executing the second transaction by using the first transaction.

Step S103. Transmit an execution result of the second transaction to the application based on the proxy component.

The blockchain node may send the execution result of the second transaction to the application based on the proxy component. For details, refer to descriptions of the following content.

After the virtual machine is invoked to complete the execution of the second transaction, the virtual machine may generate a transaction receipt for the second transaction. The transaction receipt for the second transaction may be a receipt of a format of the second blockchain (that is, a structure of a receipt on the second blockchain), the transaction receipt is used for indicating the execution result of the second transaction (for example, an execution success result or an execution failure result), and a quantity of incentive resources (for example, a quantity of gas) consumed by invoking the virtual machine to execute the second transaction may be further recorded in transaction receipt.

The incentive resource required to execute the second transaction is equal to a quantity of gas (a gas amount) required to execute the second transaction multiplied by a unit price of gas. For example, in the Ethereum network, gas may refer to the unit that measures the amount of computational effort required to execute specific operations on the Ethereum network.

The virtual machine may send the transaction receipt for the second transaction to the proxy contract for storage, and the proxy contract may store the second transaction and the transaction receipt for the second transaction. After the virtual machine is invoked to complete the execution of the second transaction, the proxy contract may further associatively store the transaction receipt for the second transaction and the transaction hash of the second transaction (that is, record a mapping 1 from the transaction hash of the second transaction to the transaction receipt for the second transaction), and may associatively store the second transaction and the transaction hash of the second transaction (that is, record a mapping 2 from the transaction hash of the second transaction to the second transaction), where the two mappings may be two status variables included in the proxy contract.

After the virtual machine is invoked to complete the execution the second transaction, the proxy contract may further send an execution result of the first transaction to an interface layer (for example, a remote procedure call (RPC)) of the first blockchain, so that the blockchain node may generate a transaction receipt for the first transaction. The transaction receipt is used for indicating the execution result of the first transaction (for example, an execution success result or an execution failure result), and the transaction receipt for the first transaction may further include a quantity of incentive resources (for example, a quantity of gas) consumed by the blockchain node to execute the first transaction.

The incentive resource required to execute the first transaction is equal to a quantity of gas (a gas amount) required to execute the first transaction multiplied by a unit price of gas. The resource required to execute the first transaction may include an incentive resource required to invoke the proxy contract to execute the first transaction (which includes a related process of invoking the proxy contract and extracting the second transaction from the first transaction and invoking the virtual machine through the proxy contract). A manager of the proxy layer (for example, the proxy component) may be responsible for (pay for) the incentive resource required to execute the first transaction.

It may be understood that an operation executed by the contract may be executed by the blockchain node running the contract.

For example, a structure of the transaction receipt for the first transaction may be shown in the following Table 3.

TABLE 3

| Field | Description |
| --- | --- |
| Code | Error code, where 0 indicates that execution succeeds, 1 indicates the execution fails, and others are other errors |

TABLE 3-continued

| Field | Description |
| --- | --- |
| Msg | Return message |
| GasUsed | Actually consumed gas (a gas amount, for example, a gas amount consumed for executing the first transaction) |

For example, a structure of the transaction receipt for the second transaction may be shown in the following Table 4.

TABLE 4

| Field | Description |
| --- | --- |
| Status | Execution status, where 1 indicates that execution succeeds, and 0 indicates the execution fails |
| GasUsed | Actually consumed gas (a gas amount, for example, a gas amount consumed for executing the second transaction) |
| Logs | Event log released in a contract execution process |
| ContractAddress | Created contract address, which exists when a to field of a transaction is null |

The blockchain node may send the transaction receipt for the first transaction to the proxy component. When determining, by using the transaction receipt, that the execution of the first transaction is completed, the proxy component may also determine that the execution of the second transaction is also completed. The proxy component may calculate a transaction hash of the second transaction and send the transaction hash of the second transaction to the application. Subsequently, the application may query for the transaction receipt of the second transaction by using the transaction hash of the second transaction. For details, refer to descriptions of the following content.

In an example, after receiving the transaction hash of the second transaction, the application may initiate, by using the transaction hash of the second transaction, a request for querying for the transaction receipt for the second transaction to the proxy component. When receiving the request for querying for the transaction receipt for the second transaction initiated by the application, the proxy component may send receipt query information (which includes the transaction hash of the second transaction) to the blockchain node. The blockchain node may extract the transaction hash of the second transaction from the receipt query information, and may query for, according to the extracted transaction hash, the transaction receipt (that is, the transaction receipt for the second transaction) associative stored with the transaction hash in the proxy contract.

Further, the blockchain node may send the queried transaction receipt to the proxy component. The proxy component may send the obtained transaction receipt to the application. The application may determine the execution result of the second transaction by using the received transaction receipt and display related prompt information of the execution result of the second transaction (for example, may alternatively directly display the transaction receipt for the second transaction) on an application interface.

The proxy component may directly invoke, by using the receipt query information, a receipt query interface related to the first blockchain, and query for the transaction receipt for the second transaction in the proxy contract of the blockchain node through the invoked receipt query interface.

Figure 6:
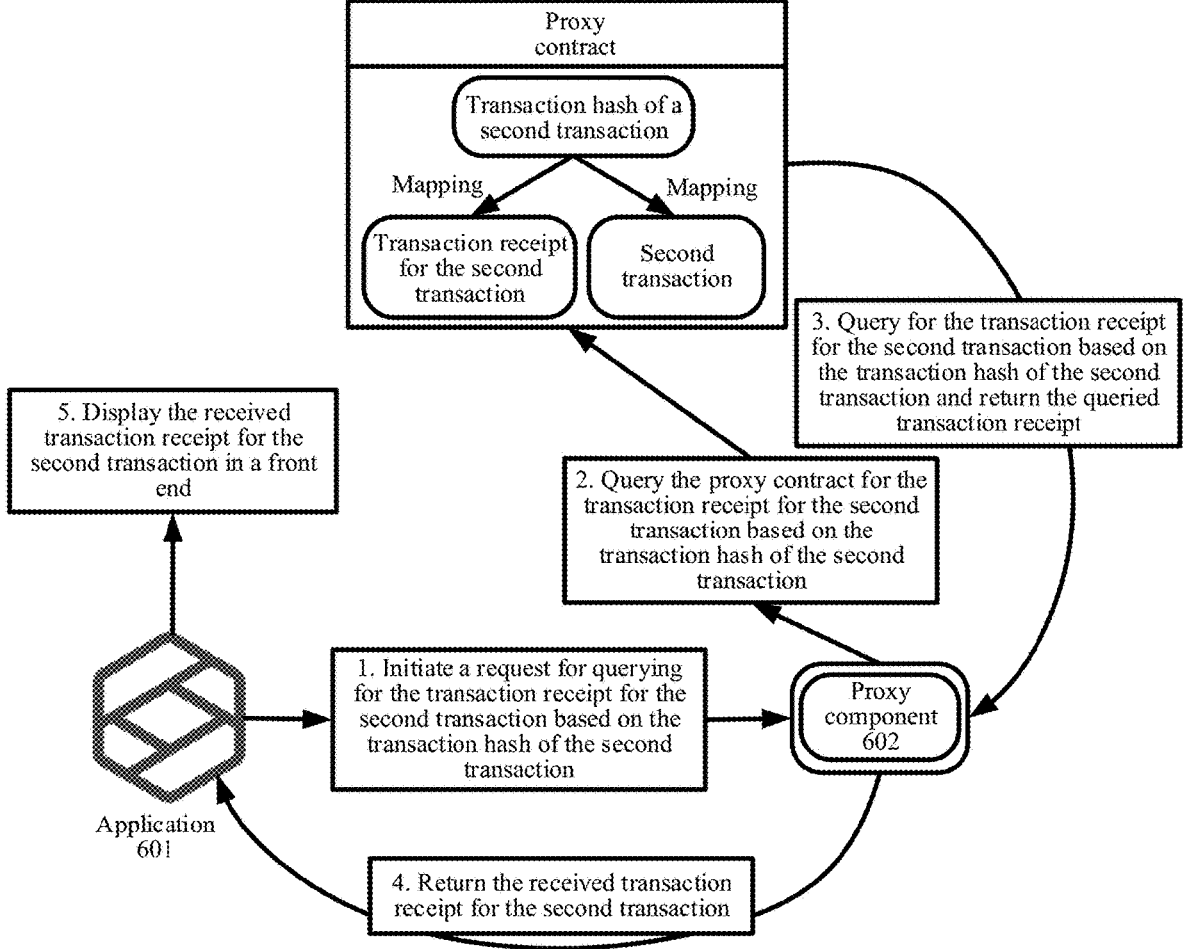
FIG. 6 is a schematic diagram of a scenario of querying for a transaction receipt according to an embodiment of this disclosure.

For example, FIG. 6 is a schematic diagram of a scenario of querying for a transaction receipt according to an embodiment of this disclosure. As shown in FIG. 6, after the virtual machine is invoked to complete the execution of the second transaction, a mapping from the transaction hash of the second transaction to the transaction receipt for the second transaction and a mapping from the transaction hash of the second transaction to the second transaction may be recorded in the proxy contract. In addition, after the virtual machine is invoked to complete the execution of the second transaction, an application 601 may also obtain the transaction hash of the second transaction returned by a proxy component 602.

The application 601 may initiate, by using the transaction hash of the second transaction, a request for querying for the transaction receipt for the second transaction to the proxy component 602. After receiving the request for querying for the transaction receipt, the proxy component 602 may also query the proxy contract for the transaction receipt for the second transaction by using the transaction hash of the second transaction.

The proxy contract may query for, according to the transaction hash of the second transaction sent by the proxy component 602, the transaction receipt (that is, the transaction receipt for the second transaction) to which the transaction hash is mapped, and then the proxy contract may return the queried transaction receipt for the second transaction to the proxy component 602.

Then, the proxy component 602 may also return the transaction receipt sent by the proxy contract to the application 601, so that the application 601 may obtain the transaction receipt for the second transaction and may also determine the execution result of the second transaction by using the transaction receipt. The application 601 may further display, in a front end, the received transaction receipt for the second transaction to an object to which the application belongs. In this way, a user can obtain the transaction receipt, to learn the execution result of the transaction, thereby improving user experience.

In an example, the application may further initiate a query request for the second transaction to the proxy component. After receiving the query request, the proxy component may send transaction query information (which includes the transaction hash of the second transaction) to the blockchain node. The blockchain node may extract the transaction hash of the second transaction from the transaction query information. Further, the blockchain node may query, according to the extracted transaction hash, the proxy contract for a transaction (that is, the second transaction) that is associative stored with the transaction hash. Then, the blockchain node may send the queried second transaction to the proxy component. The proxy component may send the obtained second transaction to the application. The application may display the received second transaction on the application interface. In this way, the user can view the transaction, thereby further improving user experience.

Similarly, the proxy component may directly invoke, by using the transaction query information, a transaction query interface related to the first blockchain, and query the proxy contract of the blockchain node for the second transaction through the invoked transaction query interface.

The method in this disclosure may serve any application under an ecology of the second blockchain (that is, the application built based on the second blockchain). A developer may rapidly build a decentralized application (DAPP, that is, the application) by using a tool under an existing ecology of the second blockchain. A transaction initiated by the built DAPP may also be executed on another blockchain (for example, the first blockchain), so that a user of the built DAPP can be more rapidly migrated to the another blockchain (for example, the first blockchain).

In addition, a new chain (for example, the first blockchain) may be compatible with a standard interface (for example, the transaction interface) of the second blockchain and may receive and execute a transaction (for example, the second transaction) in a format of the second blockchain. The developer of the second blockchain does not need to understand an application programming interface (API) of the new chain (for example the first blockchain). Therefore, without modifying the application, an original service logic of the application can be directly used, so that an application and a user under the ecology of the second blockchain are more rapidly migrated.

In this disclosure, a virtual machine configured to execute a transaction on a second blockchain may be configured on a first blockchain. A structure of a transaction on the first blockchain being different from a structure of the transaction on the second blockchain. A blockchain node on the first blockchain may obtain a first transaction based on a proxy component. The first transaction is obtained by the proxy component assembling a second transaction initiated by an application, the application is built based on the second blockchain, the first transaction belongs to the transaction on the first blockchain, and the second transaction belongs to the transaction on the second blockchain. The blockchain node on the first blockchain may further extract the second transaction from the first transaction, invoke the virtual machine to execute the second transaction, and transmit an execution result of the second transaction to the application based on the proxy component. It can be recognized that according to the method provided in this disclosure, related transaction conversion and data exchange between the application under the second blockchain and the first blockchain may be implemented through the proxy component, and the virtual machine configured to execute the transaction on the second blockchain may be further configured on the first blockchain. Therefore, even if the structure of the transaction on the first blockchain is different from the structure of the transaction on the second blockchain, the transaction on the second blockchain can also be implemented on the first blockchain without being limited to execution by a blockchain node on the second blockchain, thereby improving flexibility of transaction execution. In addition, without modifying the application under the second blockchain, the first blockchain can execute the transaction on the second blockchain, to reduce difficulty for a blockchain to execute a transaction that does not belong to the blockchain, thereby improving convenience and efficiency of cross-blockchain transaction execution.

Figure 7:
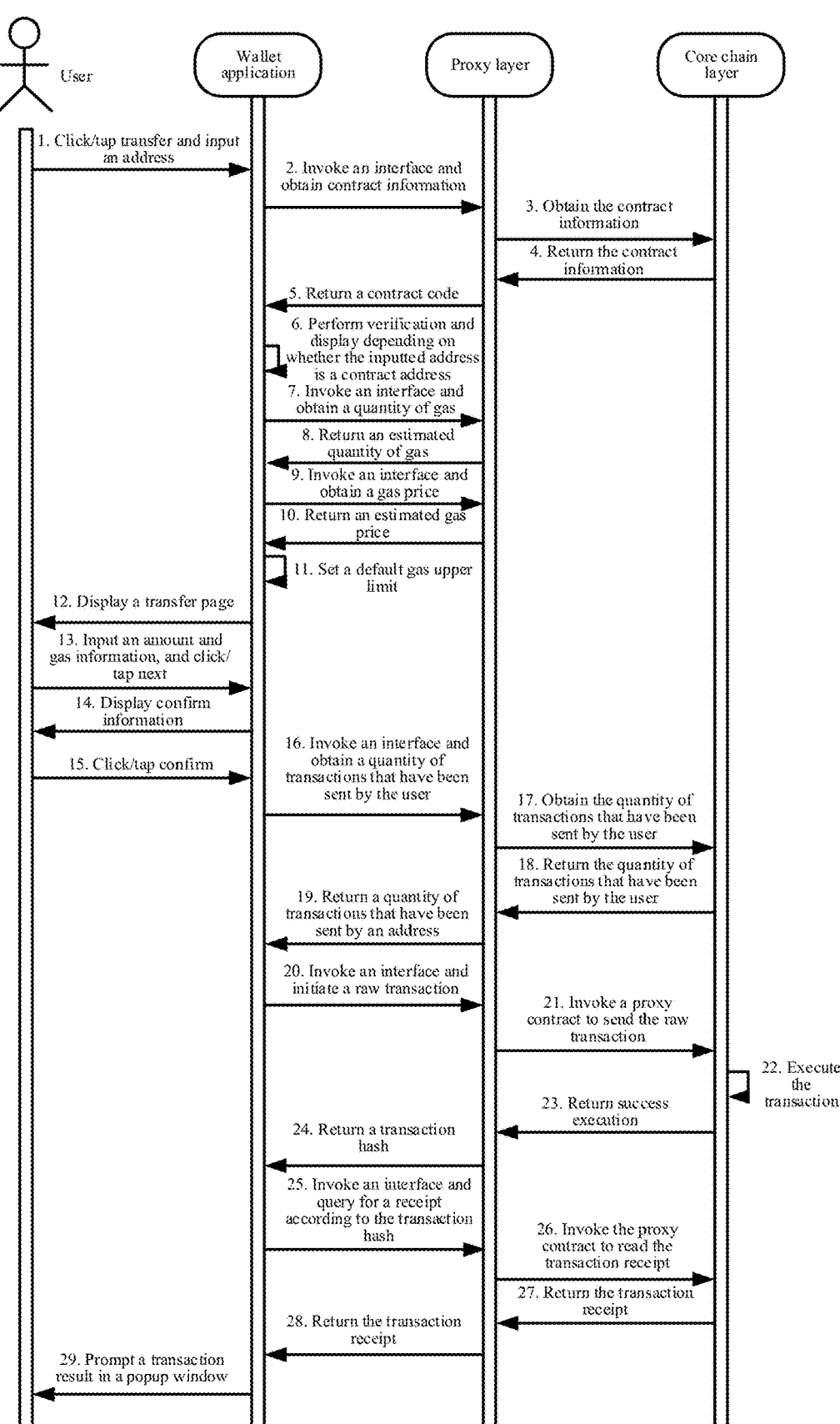
FIG. 7 is a schematic diagram of a transaction execution process according to an embodiment of this disclosure.

The following describes an exemplary blockchain transaction execution process by using an example in which an application is a wallet application. FIG. 7 is a schematic diagram of a transaction execution process according to an embodiment of this disclosure. As shown in FIG. 7, the process may include the following content.

1. The wallet application may be the application built by using the second blockchain, and a transfer transaction may be implemented through the wallet application. A user may be an object to which the wallet application belongs, and the wallet application may be run in a terminal device of the user. The user may click/tap "Transfer" (for example, click a transfer control) on an application interface of the wallet application and input a contract address related to transaction execution. The contract address may be automatically inputted by the user or may be automatically filled by the wallet application according to a contract invoking operation executed by the user, and the contract address may be an address of a smart contract that needs to be invoked when the transfer transaction is executed in a virtual machine. The user clicks/taps the transfer control in the wallet application and initiates the transfer transaction (that is, the second transaction) in the wallet application. In some examples, a corresponding smart contract does not need to be invoked during transfer, an account address of an object that receives the transfer may also be inputted.

2. The wallet application may invoke a related interface (for example, an interface for obtaining contract information, which may be denoted as getCode) of the second blockchain in response to an operation of clicking/tapping the transfer control by the user, and obtain, from a proxy layer (that is, the proxy component), contract information of a smart contract (for example, the transaction contract) indicated by the contract address.

3. The proxy layer may obtain, from a core chain layer (that is, the first blockchain), the contract information of the smart contract indicated by the contract address.

4. The core chain layer may query for the contract information corresponding to the smart contract according to the contract address and may return the queried contract information to the proxy layer, where the contract information may include a contract code corresponding to the smart contract.

5. The proxy layer may return the contract code to the wallet application.

6. After obtaining the contract code, the wallet application may verify whether the inputted address in the first step is the contract address according to the contract code, and if the contract code is not null, the wallet application may determine that the inputted address in the first step is the contract address, and the wallet application may display a verification result (for example, the verification result may be a result in which the corresponding smart contract needs to be invoked) on the application interface.

7. Step 1 to step 6 are mainly for determining whether the inputted address in step 1 is the contract address or an external account address (for example, an account address of a second object), if it is determined that the inputted address is the contract address, the wallet application may display related information of a contract corresponding to the contract address on the application interface, and if it is determined that the inputted address is the account address, the wallet application may display related information of transferring to the account address on the application interface. After the determining, the wallet application may invoke a related interface (for example, an interface for obtaining estimated gas (a gas amount), which may be denoted as estimateGas) of the second blockchain, and obtain an estimated quantity of gas from the proxy layer.

8. The proxy layer may estimate, according to a preconfigured related algorithm, a quantity of gas required by the wallet application to initiate the transfer transaction, and may return the calculated quantity of gas to the wallet application.

9. Then, the wallet application may invoke a related interface (for example, an interface for obtaining a gas price, which may be denoted as gasPrice) of the second blockchain, and obtain an estimated gas price (which may be understood as a unit price of gas) from the proxy layer.

10. The proxy layer may return the estimated gas price to the wallet application.

11. The user may set a default upper limit for an incentive resource consumed by the transfer transaction in the wallet application.

12. The wallet application may display a transfer page to the user.

13. The user may input a to-be-transferred amount (for example, a quantity of target resources) and related gas information (for example, a quantity of incentive resources that need to be consumed) in the transfer page and click/tap "Next".

14. The wallet application may display confirmation information for the transfer transaction currently initiated by the user in an application page to enable the user to make a confirmation.

15. The user clicks/taps "Confirm" on the confirmation information displayed by the wallet application.

16. The wallet application may invoke a related interface (for example, an interface for obtaining account information, which may be denoted as getTransactionCount) of the second blockchain and obtain, from the proxy layer, a quantity of transactions that have been sent by the user (that is, an object to which the wallet application belongs).

17. The proxy layer may obtain, from a core chain layer (for example, from a blockchain node in the core chain layer), the quantity of transactions that have been sent by the user (that is, the object to which the wallet application belongs).

18. The core chain layer may return the quantity of transactions that have been sent by the user (that is, the object to which the wallet application belongs) to the proxy layer.

19. The proxy layer may return a quantity of transactions that are sent by an address (which may be understood as an account address of the user), that is, the quantity of transactions that have been sent by the user (that is, the object to which the wallet application belongs), to the wallet application.

20. The wallet application may invoke a related interface (for example, an interface for initiating a transaction, which may be denoted as sendRawTransaction) of the second blockchain, and initiate a raw transaction (that is, the second transaction) to the proxy layer, where a total quantity nonce of transactions that currently have been sent by the user may be encapsulated in the raw transaction.

21. The proxy layer may invoke a proxy contract to send the raw transaction, where the method may include: assembling, by the proxy layer, identification information of the proxy contract that needs to be invoked together with the raw transaction and another related information, to obtain the first transaction, and sending the first transaction to the core chain layer.

22. After obtaining the first transaction, the core chain layer may invoke the proxy contract to execute the first transaction, for example, invoke a virtual machine to execute the second transaction encapsulated in the first transaction.

23. After invoking the virtual machine to complete the execution of the second transaction, and complete the execution of the first transaction, the core chain layer may return prompt information indicating that the execution of the first transaction succeeds to the proxy layer, for example, may return a transaction receipt for the first transaction.

24. When receiving the prompt information indicating that the execution of the first transaction succeeds returned by the core chain layer, the proxy layer may return a transaction hash (that is, a transaction hash) of the raw transaction to the wallet application.

25. The wallet application may invoke a related interface (for example, a receipt query interface, which may be denoted as getTransactionReceipt) of the second blockchain, and query the proxy layer for a transaction receipt for the raw transaction by using the transaction hash of the raw transaction.

26. The proxy layer may invoke the proxy contract by using the transaction hash of the raw transaction to read the corresponding transaction receipt (the transaction receipt has a mapping relationship with the transaction hash) from the core chain layer 27. The core chain layer may return the read transaction receipt to the proxy layer.

28. The proxy layer may return the received transaction receipt to the wallet application.

29. The wallet application may prompt the user of a transaction result in a form of a popup window (or in another form), where the transaction result is an execution result of the raw transaction indicated by the transaction receipt, for example, a transaction failure result or a transaction success result, that is, a transfer failure result or a transfer success result.

According to the method provided in this disclosure, related transaction conversion and data exchange between the application and the first blockchain may be implemented through the proxy component, and the virtual machine configured to execute the transaction on the second blockchain may be further configured on the first blockchain. Therefore, even if the structure of the transaction on the first blockchain is different from the structure of the transaction on the second blockchain, the transaction on the second blockchain can also be implemented on the first blockchain without being limited to execution by a blockchain node on the second blockchain, thereby improving flexibility of transaction execution. In addition, without modifying the application under the second blockchain, the first blockchain can execute the transaction on the second blockchain, to reduce difficulty for a blockchain to execute a transaction that does not belong to the blockchain, thereby improving convenience and efficiency of cross-blockchain transaction execution.

Figure 8:
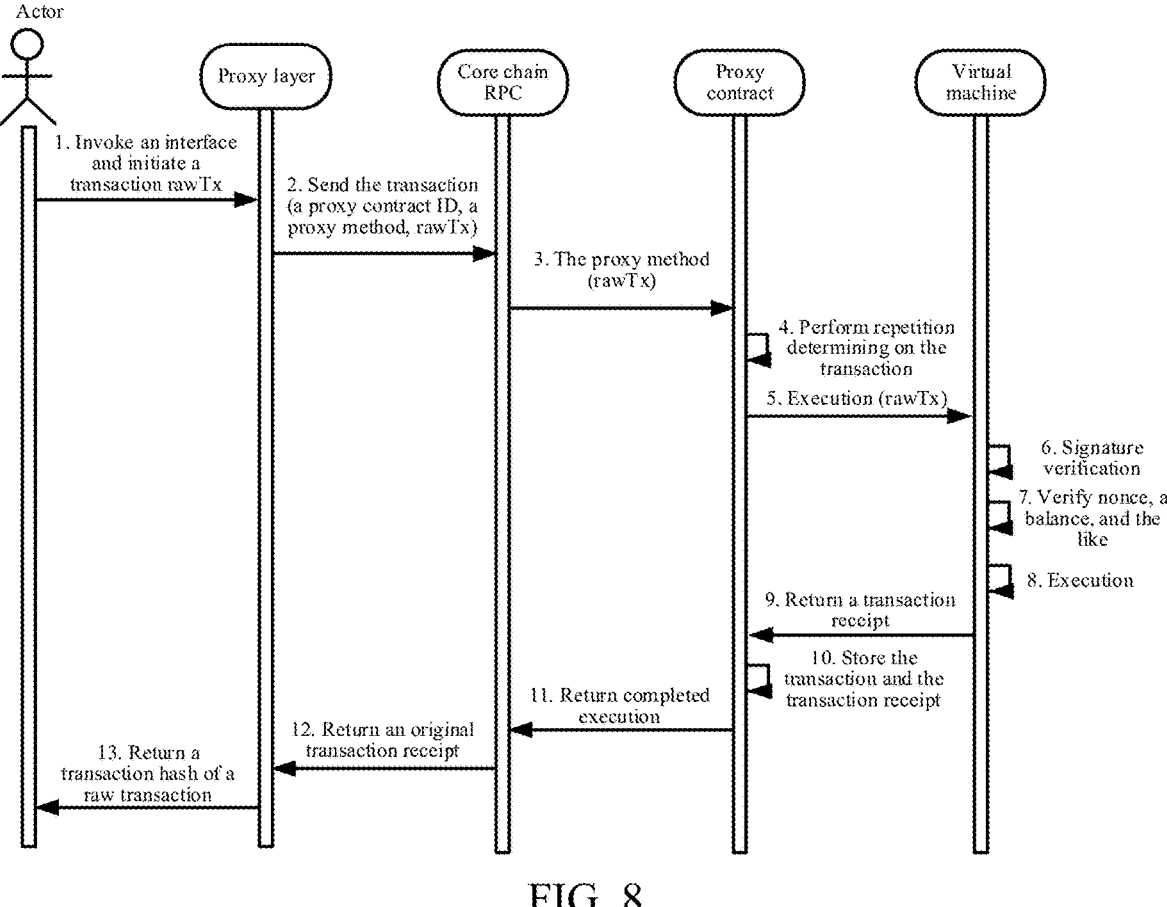
FIG. 8 is a schematic diagram of another transaction execution process according to an embodiment of this disclosure.

FIG. 8 is a schematic diagram of another transaction execution process according to an embodiment of this disclosure. As shown in FIG. 8, the process may include the following content.

1. The Actor may refer to an application, where the application may be operated by a user, and the application may be built based on a second blockchain. The application may invoke a related interface of the second blockchain to initiate a transaction to a proxy layer (that is, a proxy component), for example, send binary data rawTx (that is, a second transaction) of the second transaction to the proxy layer.

2. The proxy layer may send the transaction to a core chain RPC (an interface layer of a core chain), where the sent transaction may refer to a first transaction, and the first transaction may include an identifier (ID) of a proxy contract, a proxy method (that is, a contract method) that needs to be invoked in the proxy contract, and a transaction rawTx.

3. After receiving the first transaction, the core chain RPC may invoke the proxy method in the proxy contract according to the ID of the proxy contract, the proxy method (that is, the contract method) that needs to be invoked in the proxy contract, and the transaction rawTx in the first transaction, where an input parameter of the proxy method in the proxy contract is the transaction rawTx.

4. The proxy contract may perform repetition determining on the transaction rawTx, that is, determine whether the transaction rawTx has been executed, and then may perform the following operation if the transaction rawTx has not been executed.

5. The proxy contract may invoke a virtual machine to execute the transaction rawTx extracted from the first transaction.

6. Before executing the transaction rawTx, the virtual machine may verify the transaction rawTx, and may execute step 7 if signature verification on the transaction rawTx succeeds.

7. The virtual machine may further verify a quantity nonce of transactions in the transaction rawTx and verify an account balance (that is, the account remaining resource) of an object to which the application belongs, and may execute step 8 if both the verifications succeed.

8. The virtual machine may execute the transaction rawTx.

9. After completing the execution of the transaction rawTx, the virtual machine may return a transaction receipt for the transaction rawTx to the proxy contract.

10. The proxy contract may store the transaction rawTx and the transaction receipt for the transaction rawTx.

11. The proxy contract may return the first transaction and an execution result of the second transaction to the core chain RPC.

12. The core chain RPC may return an original transaction receipt (that is, a transaction receipt for the first transaction) to the proxy layer.

13. When determining that the execution of the first transaction is completed, the proxy layer may also determine that the execution of the second transaction is also completed (the first transaction may be a transaction for invoking the proxy contract to execute the second transaction by using a corresponding service logic), and the proxy layer may return a transaction hash of a raw transaction (that is, the second transaction) to the application, so that the application may subsequently query for a transaction receipt for the second transaction and the second transaction by using the transaction hash, that is, the transaction hash of the second transaction may be mapped to the transaction receipt of the second transaction and may also be mapped to the second transaction in the proxy contract.

According to the method provided in this disclosure, related transaction conversion and data exchange between the application and the first blockchain may be implemented through the proxy component, and the virtual machine configured to execute the transaction on the second blockchain may be further configured on the first blockchain. Therefore, even if the structure of the transaction on the first blockchain is different from the structure of the transaction on the second blockchain, the transaction on the second blockchain can also be implemented on the first blockchain without being limited to execution by a blockchain node on the second blockchain, thereby improving flexibility of transaction execution. In addition, without modifying the application under the second blockchain, the first blockchain can execute the transaction on the second blockchain, to reduce difficulty for a blockchain to execute a transaction that does not belong to the blockchain, thereby improving convenience and efficiency of cross-blockchain transaction execution.

Figure 9:
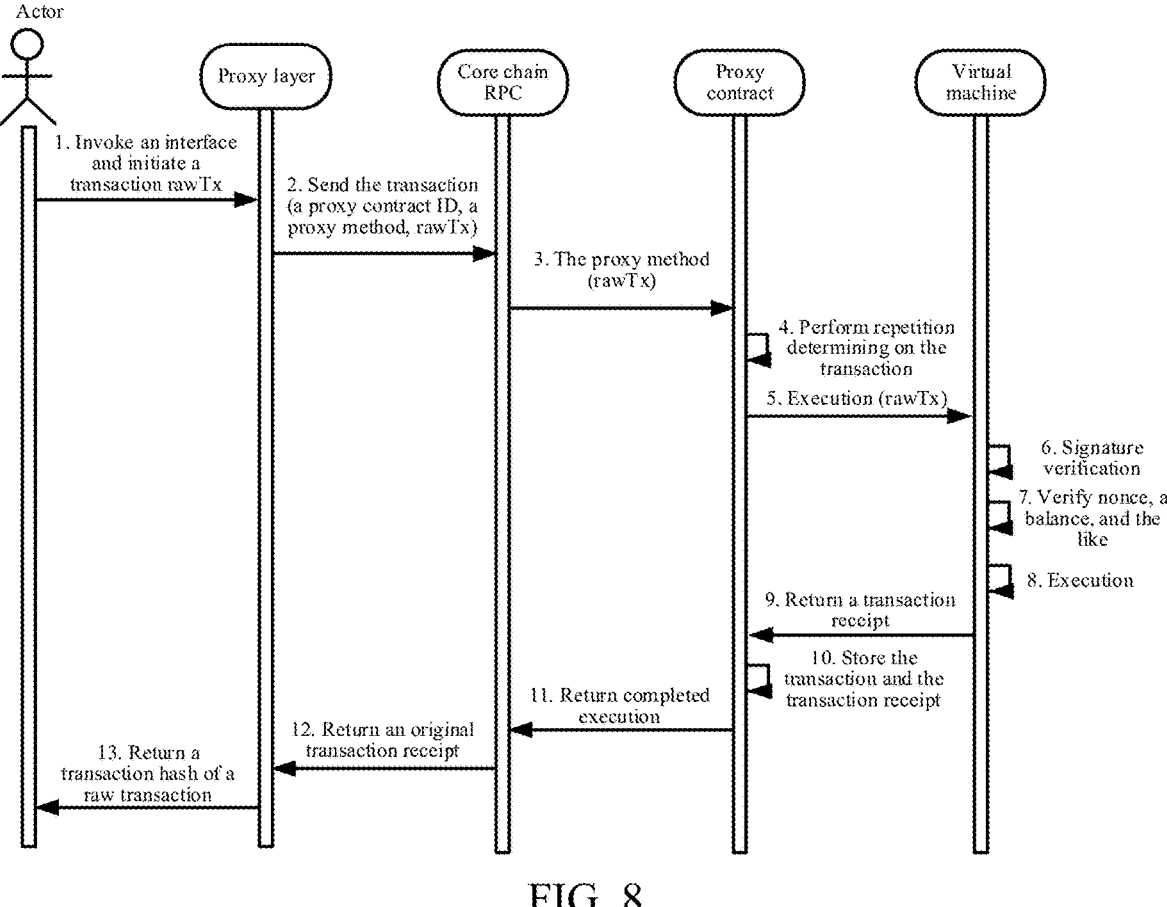
FIG. 9 is a schematic structural diagram of a blockchain transaction execution apparatus according to an embodiment of this disclosure.

FIG. 9 is a schematic structural diagram of a blockchain transaction execution apparatus according to an embodiment of this disclosure. The blockchain transaction execution apparatus may be a computer program (including program code) run on a computer device. For example, the blockchain transaction execution apparatus is application software, and the blockchain transaction execution apparatus may be configured to perform the corresponding steps in the method provided in the embodiments of this disclosure. The apparatus may be disposed on a blockchain node on a first blockchain, and a virtual machine configured to execute a transaction on a second blockchain is configured on the first blockchain. A structure of a transaction on the first blockchain is different from a structure of the transaction on the second blockchain. As shown in FIG. 9, the blockchain transaction execution apparatus 1 may include: an obtaining module 11, an execution module 12, and a transmitting module 13.

The obtaining module 11 is configured to obtain a first transaction based on a proxy component. The first transaction is obtained by the proxy component assembling a second transaction initiated by an application, the application is built based on the second blockchain, the first transaction belongs to the transaction on the first blockchain, and the second transaction belongs to the transaction on the second blockchain.

The execution module 12 is configured to extract the second transaction from the first transaction, and invoke the virtual machine to execute the second transaction.

The transmitting module 13 is configured to transmit an execution result of the second transaction to the application based on the proxy component.

In some examples, identification information of a proxy contract corresponding to the first blockchain is assembled in the first transaction.

The execution module 12 is configured to extract the identification information from the first transaction; invoke the proxy contract according to the identification information, and extract the second transaction from the first transaction; and invoke the virtual machine based on the proxy contract to execute the extracted second transaction.

In some examples, in a case that the execution of the second transaction is completed, a transaction hash of the second transaction is stored in the proxy contract.

The execution module 12 is further configured to: in a case that it is detected that the transaction hash is not stored in the proxy contract, invoke the virtual machine based on the proxy contract to execute the extracted second transaction.

In some examples, the transmitting module 13 is configured to generate a transaction receipt for the second transaction after invoking the virtual machine to complete the execution of the second transaction, the transaction receipt being used for indicating the execution result of the second transaction; associatively store the transaction receipt and the transaction hash of the second transaction, and transmit the transaction hash to the application based on the proxy component; in a case that receipt query information for the application is received based on the proxy component, extract the transaction hash from the receipt query information; and query for the transaction receipt according to the transaction hash, and transmit the queried transaction receipt to the application based on the proxy component.

In some examples, the transmitting module 13 is further configured to associatively store the second transaction and the transaction hash after invoking the virtual machine to complete the execution of the second transaction; in a case that transaction query information for the application is received based on the proxy component, extract the transaction hash from the transaction query information; and query for the second transaction according to the transaction hash, and transmit the queried second transaction to the application based on the proxy component.

In some examples, the proxy component is formed based on a target process, and the target process does not belong to the first blockchain and the second blockchain; or the proxy component is a component embedded into the first blockchain.

In some examples, the proxy component is configured to be docked with a transaction interface of the second blockchain, and the application initiates the second transaction to the proxy component by invoking the transaction interface of the second blockchain.

In some examples, the second transaction has a transaction signature of the application. The execution module 12 is further configured to invoke the virtual machine to verify the second transaction based on the transaction signature; and in a case that the second transaction is successfully verified, invoke the virtual machine to execute the second transaction.

In some examples, a quantity of transactions historically initiated by the application is assembled in the second transaction. The execution module 12 is further configured to invoke the virtual machine to obtain account information of the application, and determine, according to the account information, a quantity of transactions historically initiated by the application; and in a case that the quantity of transactions assembled in the second transaction is the same as the quantity of transactions determined according to the account information, invoke the virtual machine to execute the second transaction.

In some examples, the second transaction is a transaction in which a first object to which the application belongs transfers a target resource to a second object. The execution module 12 is further configured to obtain an incentive resource required to execute the second transaction; obtain account information of the first object, and determine an account remaining resource of the first object according to the account information; and in a case that a sum of the incentive resource and the target resource is less than or equal to the account remaining resource, invoke the virtual machine to execute the second transaction.

In some examples, a transaction contract used for executing the transaction on the second blockchain is created in the virtual machine. The execution module 12 is further configured to invoke the transaction contract based on the virtual machine to execute the second transaction.

According to an embodiment of this disclosure, the steps in the blockchain transaction execution method shown in FIG. 3 may be performed by the modules of the blockchain transaction execution apparatus 1 shown in FIG. 9. For example, step S101 shown in FIG. 3 may be performed by the obtaining module 11 shown in FIG. 9, and step S102 shown in FIG. 3 may be performed by the execution module 12 shown in FIG. 9. Step S103 shown in FIG. 3 may be executed by the transmitting module 13 shown in FIG. 9.

Based on the foregoing, a virtual machine configured to execute a transaction on a second blockchain may be configured on a first blockchain. A structure of a transaction on the first blockchain being different from a structure of the transaction on the second blockchain. A blockchain node on the first blockchain may obtain a first transaction based on a proxy component. The first transaction is obtained by the proxy component assembling a second transaction initiated by an application, the application is built based on the second blockchain, the first transaction belongs to the transaction on the first blockchain, and the second transaction belongs to the transaction on the second blockchain. The blockchain node on the first blockchain may further extract the second transaction from the first transaction, invoke the virtual machine to execute the second transaction, and transmit an execution result of the second transaction to the application based on the proxy component. It can be recognized that according to the method provided in this disclosure, related transaction conversion and data exchange between the application under the second blockchain and the first blockchain may be implemented through the proxy component, and the virtual machine configured to execute the transaction on the second blockchain may be further configured on the first blockchain. Therefore, even if the structure of the transaction on the first blockchain is different from the structure of the transaction on the second blockchain, the transaction on the second blockchain can also be implemented on the first blockchain without being limited to execution by a blockchain node on the second blockchain, thereby improving flexibility of transaction execution. In addition, without modifying the application under the second blockchain, the first blockchain can execute the transaction on the second blockchain, to reduce difficulty for a blockchain to execute a transaction that does not belong to the blockchain, thereby improving convenience and efficiency of cross-blockchain transaction execution.

According to an embodiment of this disclosure, each module in the blockchain transaction execution apparatus 1 shown in FIG. 9 may be separately or all combined into one or more several units. Alternatively, a (some) unit(s) in the blockchain transaction execution apparatus may be further disassembled into a plurality of subunits having smaller functions. In this way, same operations may also be implemented without affecting achieving the technical effects of the embodiments of this disclosure. The foregoing modules are divided based on logical functions. In an actual application, a function of one module may be implemented by a plurality of units, or functions of a plurality of modules are implemented by one unit. In another embodiment of this disclosure, the blockchain transaction execution apparatus 1 may also include other units. In an actual application, these functions may also be cooperatively implemented by other units and may be cooperatively implemented by a plurality of units.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

According to an embodiment of this disclosure, a computer program (including program code) that can perform the steps in the corresponding method shown in FIG. 3 may be run on a general computer device, which includes processing elements and storage elements such as a central processing unit (CPU), a random access memory (RAM), and a read-only memory (ROM), to construct the blockchain transaction execution apparatus 1 shown in FIG. 9 and implement the blockchain transaction execution method in the embodiments of this disclosure. The computer program may be recorded in, for example, a computer-readable recording medium (such as a non-transitory computer-readable storage medium), and may be loaded into the foregoing computing device by using the computer-readable recording medium, and run in the computing device.

Figure 10:
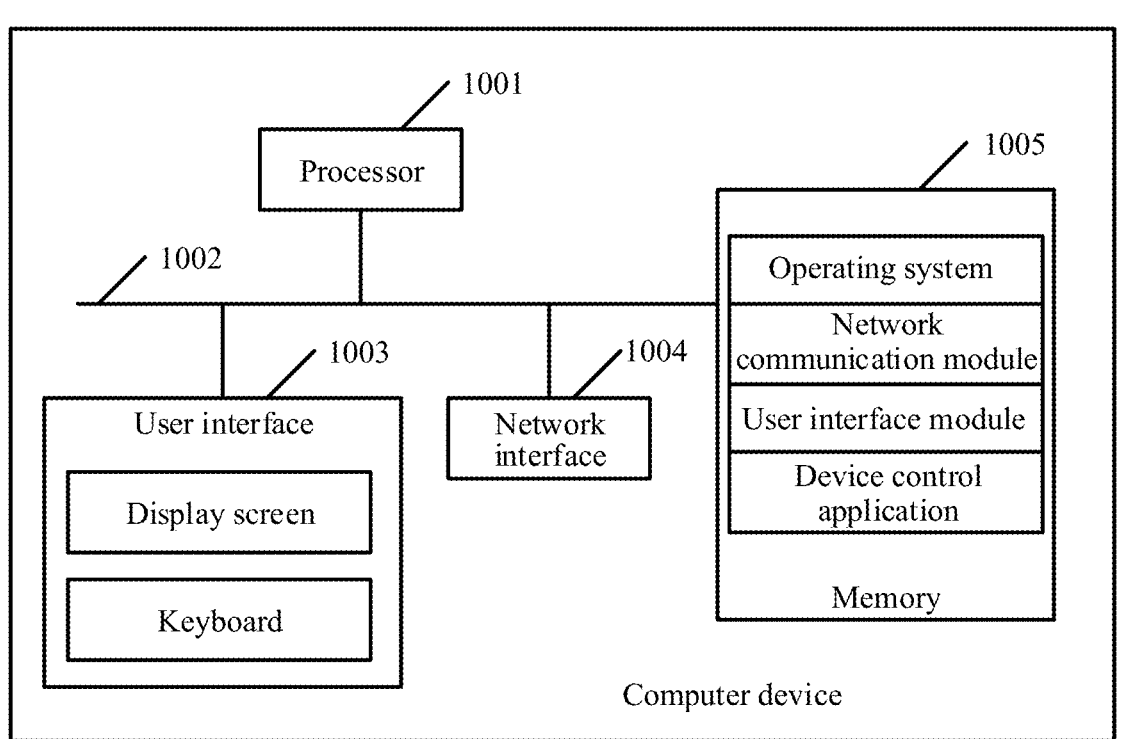
FIG. 10 is a schematic structural diagram of a computer device according to an embodiment of this disclosure.

FIG. 10 is a schematic structural diagram of a computer device according to an embodiment of this disclosure. As shown in FIG. 10, the computer device 1000 may include: processing circuitry (such as a processor 1001), a network interface 1004, and a memory 1005, as well as a user interface 1003 and at least one communication bus 1002. The communication bus 1002 is configured to implement connection and communication between these components. The user interface 1003 may include a display, a keyboard, and in some examples, the user interface 1003 may further include a standard wired interface and a standard wireless interface. The network interface 1004 may include a standard wired interface and a standard wireless interface (for example, a Wi-Fi interface). The memory 1005 may be a high-speed RAM memory, or may be a non-volatile memory (non-volatile memory), for example, at least one magnetic disk memory. The memory 1005 may be further at least one storage apparatus that is located far away from the processor 1001. As shown in FIG. 10, the memory 1005, which is used as a computer storage medium, may include an operating system, a network communication module, a user interface module, and a device control application program.

In the computer device 1000 shown in FIG. 10, the network interface 1004 may provide a network communication function, the user interface 1003 is mainly configured to provide an input interface for a user, and the processor 1001 may be configured to invoke the device control application stored in the memory 1005, to implement the following content:

obtaining a first transaction based on a proxy component, a virtual machine configured to execute a transaction on a second blockchain being configured on a first blockchain; a structure of a transaction on the first blockchain being different from a structure of the transaction on the second blockchain; and the first transaction being obtained by the proxy component assembling a second transaction initiated by an application, the application being built based on the second blockchain, the first transaction belonging to the transaction on the first blockchain, and the second transaction belonging to the transaction on the second blockchain;

extracting the second transaction from the first transaction, and invoking the virtual machine to execute the second transaction; and transmitting an execution result of the second transaction to the application based on the proxy component.

It is to be understood that the computer device 1000 described in this embodiment of this disclosure can implement the descriptions of the blockchain transaction execution method in the foregoing embodiment corresponding to FIG. 3, and can also implement the descriptions of the blockchain transaction execution apparatus 1 in the foregoing embodiment corresponding to FIG. 9. Details are not described herein again. In addition, the description of beneficial effects of the same method are not described herein again.

In addition, an embodiment of this disclosure further provides a computer-readable storage medium, and the computer-readable storage medium stores the computer program executed by the blockchain transaction execution apparatus 1 mentioned above. When executing the computer program, the processor can perform the descriptions of the blockchain transaction execution method in the embodiment corresponding to FIG. 3. Therefore, details are not described herein again. In addition, the description of beneficial effects of the same method are not described herein again. For technical details that are not disclosed in the computer storage medium embodiments of this disclosure, refer to the descriptions of the method embodiments of this disclosure.

In an example, the computer program may be deployed to be executed on a computer device, or deployed to be executed on a plurality of computer devices at the same location, or deployed to be executed on a plurality of computer devices that are distributed in a plurality of locations and interconnected by a communication network. The plurality of computer devices that are distributed in the plurality of locations and interconnected by the communication network may form a blockchain network.

The computer-readable storage medium may be included in the blockchain transaction execution apparatus provided in any of the foregoing embodiments or an internal storage unit of the computer device, for example, a hard disk or an internal memory of the computer device. The computer-readable storage medium may also be an external storage device of the computer device, such as a plug-in hard disk, a smart media card (SMC), a secure digital (SD) card, or a flash card that is equipped on the computer device. Further, the computer-readable storage medium may also include an internal storage unit of the computer device and an external storage device. The computer-readable storage medium is configured to store the computer program and another program and data that are required by the computer device. The computer-readable storage medium may be further configured to temporarily store data that has been outputted or data to be outputted.

This disclosure provides a computer program product or a computer program, the computer program product or the computer program including a computer program, the computer program being stored in a computer-readable storage medium. A processor of a computer device reads the computer program from the computer-readable storage medium, and executes the computer program, to cause the computer device to perform the blockchain transaction execution method. Therefore, details are not described herein again. In addition, the description of beneficial effects of the same method are not described herein again. For technical details that are not disclosed in the embodiments of the computer-readable storage medium of this disclosure, refer to the method embodiments of this disclosure.

In the specification, claims, and accompanying drawings of the embodiments of this disclosure, the terms "first", "second", or the like are intended to distinguish between different objects but do not indicate a particular order. In addition, the terms "include" and any variant thereof are intended to cover a non-exclusive inclusion. For example, a process, method, apparatus, product, or device that includes a series of steps or units is not limited to the listed steps or modules; and instead, may further include a step or module that is not listed, or may further include another step or unit that is intrinsic to the process, method, apparatus, product, or device.

A person of ordinary skill in the art may be aware that, the units and algorithm steps in the examples described with reference to the embodiments disclosed herein may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it is not to be considered that the implementation goes beyond the scope of this disclosure.

The method and the related apparatus provided in the embodiments of this disclosure are described with reference to method flowcharts and/or schematic structural diagrams provided in the embodiments of this disclosure. Specifically, computer program instructions may be used to implement each process and/or each block in the method flowcharts and/or the schematic structural diagrams and a combination of a process and/or a block in flowcharts and/or block diagrams. These computer program instructions may be provided to a general-purpose computer, a dedicated computer, an embedded processor, or a processor of another programmable data processing apparatus to generate a machine, so that the instructions executed by the computer or the processor of the another programmable data processing apparatus generate an apparatus for implementing a specific function in one or more processes in the flowcharts and/or in one or more blocks in the schematic structural diagrams. These computer program instructions may alternatively be stored in a computer-readable memory that can instruct a computer or another programmable data processing device to work in a specific manner, so that the instructions stored in the computer-readable memory generate an artifact that comprises an instruction apparatus. The instruction apparatus implements a specific function in one or more procedures in the flowcharts and/or in one or more blocks in the schematic structural diagrams. These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the schematic structural diagrams.

What is disclosed above is merely exemplary embodiments of this disclosure, and certainly is not intended to limit the scope of the claims of this disclosure. Therefore, equivalent variations made in accordance with the claims of this disclosure shall fall within the scope of this disclosure.

What is claimed is:

1. A computer-implemented blockchain transaction execution method, comprising:

receiving, by a proxy program component configured to interface with a second blockchain, a second transaction initiated by an application associated with the second blockchain, the second transaction having a second data format conforming to the second blockchain;

assembling, by the proxy program component, a first transaction in a first data format, wherein the first transaction includes the second transaction and a proxy contract identifier for processing via a first blockchain, the first data format of the first transaction being different from the second data format of the second transaction;

transmitting the first transaction to a blockchain node of the first blockchain;

extracting, by the blockchain node of the first blockchain and based on the proxy contract identifier, the second transaction from the first transaction;

invoking, by the blockchain node of the first blockchain and based on the proxy contract identifier, a virtual machine that is configured to execute transactions of the second blockchain having the second data format, the virtual machine being preconfigured to execute the extracted second transaction in the second data format of the second blockchain;

generating, via the virtual machine, a transaction receipt conforming to the second data format of the second blockchain; and transmitting the transaction receipt to the application associated with the second blockchain via the proxy program component.

2. The method according to claim 1, wherein the first transaction includes identification information of a proxy contract corresponding to the first blockchain, the identification information indicating the proxy contract identifier; and the extracting the second transaction from the first transaction comprises:

extracting the identification information from the first transaction, invoking the proxy contract according to the identification information, and extracting, via the proxy contract, the second transaction from the first transaction; and the invoking the virtual machine includes invoking the virtual machine via the proxy contract to execute the second transaction.

3. The method according to claim 2, wherein a transaction hash of the second transaction is stored in the proxy contract when the execution of the second transaction is completed; and the invoking the virtual machine based on using the proxy contract comprises:

invoking the virtual machine based on the proxy contract to execute the second transaction when the transaction hash is not already stored in the proxy contract.

4. The method according claim 1, wherein the transmitting the transaction receipt to the application via the proxy program component comprises:

generating the transaction receipt for the second transaction after execution by the virtual machine, the transaction receipt indicating an execution result of the second transaction;

storing the transaction receipt and a transaction hash of the second transaction;

transmitting the transaction hash to the application via the proxy program component;

receiving receipt query information for the application via the proxy program component;

extracting the transaction hash from the receipt query information;

querying for the transaction receipt according to the transaction hash; and transmitting the queried transaction receipt to the application via the proxy program component.

5. The method according to claim 4, further comprising:

storing the second transaction and the transaction hash after invoking the virtual machine completes the execution;

receiving transaction query information for the application via the proxy program component;

extracting the transaction hash from the transaction query information;

querying for the second transaction according to the transaction hash; and transmitting the queried second transaction to the application via the proxy program component.

6. The method according to claim 1, further comprising:

performing, by the proxy program component, a target process associated with the second transaction.

7. The method according to claim 1, further comprising:

receiving, by the proxy program component, the second transaction from the application via a transaction interface of the second blockchain.

8. The method according to claim 1, wherein the second transaction includes a transaction signature of the application; and the invoking the virtual machine comprises:

verifying the second transaction based on the transaction signature; and executing the second transaction when the second transaction is verified.

9. The method according to claim 1, wherein the invoking the virtual machine comprises:

obtaining account information of the application;

determining a quantity of prior transactions previously initiated by the application; and executing the second transaction when the quantity of transactions in the second transaction matches the determined quantity of the prior transactions.

10. The method according to claim 1, wherein the invoking the virtual machine comprises:

obtaining an incentive resource required to execute the second transaction;

obtaining account information of a first object associated with the application;

determining an account remaining resource of the first object according to the account information; and executing the second transaction when a sum of the incentive resource and a target resource associated with the first object is less than or equal to the account remaining resource.

11. The method according to claim 1, wherein:

the virtual machine includes a transaction contract configured to execute the second transaction of the second blockchain; and invoking the virtual machine includes invoking the transaction contract to execute the second transaction.

12. A blockchain transaction execution apparatus, the apparatus comprising:

a proxy program component, the proxy program component comprising:

a first processor;

a first memory that stores first computer-readable instructions which, when executed by the first processor, cause the first processor to perform operations to:

receive a second transaction initiated by an application associated with a second blockchain, the second transaction having a second data format conforming to the second blockchain;

assemble a first transaction in a first data format, wherein the first transaction that includes the second transaction and a proxy contract identifier for processing via a first blockchain, the first data format of the first transaction being different from the second data format of the second transaction; and transmit the first transaction to a blockchain node of the first blockchain;

the blockchain node of the first blockchain, the blockchain node of the first blockchain comprising:

a second processor;

a second memory that stores second computer-readable instructions which, when executed by the second processor, cause the second processor to perform operations to:

receive the first transaction from the proxy program component;

extract based on the proxy contract identifier, the second transaction from the first transaction;

invoke based on the proxy contract identifier, a virtual machine that is configured to execute transactions of the second blockchain having the second data format, the virtual machine being preconfigured to execute the extracted second transaction in the second blockchain format of the second blockchain;

generate, via the virtual machine, a transaction receipt conforming to the second data format of the second blockchain; and transmit the transaction receipt to the application associated with the second blockchain via the proxy program component.

13. The blockchain transaction execution apparatus according to claim 12, wherein the first transaction includes identification information of a proxy contract corresponding to the first blockchain, the identification information indicating the proxy contract identifier; and the second computer-readable instructions, when executed by the second processor, cause the second processor to:

extract the identification information from the first transaction, invoke the proxy contract according to the identification information, extract the second transaction from the first transaction, and invoke the virtual machine based on the proxy contract to execute the second transaction.

14. The blockchain transaction execution apparatus according to claim 13, wherein a transaction hash of the second transaction is stored in the proxy contract when the execution of the second transaction is completed; and the second computer-readable instructions, when executed by the second processor, cause the second processor to invoke the virtual machine based on the proxy contract to execute the second transaction when the transaction hash is not already stored in the proxy contract.

15. The blockchain transaction execution apparatus according to claim 12, wherein the second computer-readable instructions, when executed by the second processor, cause the second processor to:

generate the transaction receipt for the second transaction after execution by the virtual machine, the transaction receipt indicating an execution result of the second transaction;

store the transaction receipt and a transaction hash of the second transaction;

transmit the transaction hash to the application via the proxy program component;

receive receipt query information from the application via the proxy program component;

extract the transaction hash from the receipt query information;

query for the transaction receipt according to the transaction hash; and transmit the queried transaction receipt to the application via the proxy program component.

16. The blockchain transaction execution apparatus according to claim 15, wherein the second computer-readable instructions, when executed by the second processor, cause the second processor to:

store the second transaction and the transaction hash after the virtual machine completes the execution;

receive transaction query information for the application via the proxy program component;

extract the transaction hash from transaction query information;

query the second transaction according to the transaction hash; and transmit the queried second transaction to the application via the proxy program component.

17. The blockchain transaction execution apparatus according to claim 12, wherein the proxy program component is configured to perform a target process associated with the second transaction.

18. The blockchain transaction execution apparatus according to claim 12, wherein the proxy program component is configured to receive the second transaction from the application via a transaction interface of the second blockchain.

19. The blockchain transaction execution apparatus according to claim 12, wherein the second transaction includes a transaction signature of the application; and the second computer-readable instructions, when executed by the second processor, cause the second processor to:

verify the second transaction based on the transaction signature; and execute the second transaction when the second transaction is verified.

* * * * *